United States Patent [19]
McNeil

[11] Patent Number: 5,312,145
[45] Date of Patent: May 17, 1994

[54] MOTOR VEHICLE BODY PROTECTION APPARATUS AND METHOD OF MAKING

[76] Inventor: Robert A. McNeil, 4400 Memorial Dr. No. 1200, Houston, Tex. 77007

[21] Appl. No.: 28,462

[22] Filed: Mar. 9, 1993

[51] Int. Cl.⁵ .......................................... B60R 19/42
[52] U.S. Cl. ................................. 293/128; 293/126; 293/DIG. 6; 29/428
[58] Field of Search ............... 293/1, 109, 118, 119, 293/126, 128, DIG. 6; 296/207; 150/166; 280/770; 52/716.5; 49/462; 29/428, 897.2

[56] References Cited

U.S. PATENT DOCUMENTS

| | | |
|---|---|---|
| 3,610,684 | 10/1971 | Richter . |
| 3,738,695 | 6/1973 | McBee . |
| 4,014,583 | 3/1977 | Forbes . |
| 4,530,519 | 7/1985 | Marshall . |
| 4,750,767 | 6/1988 | Barnett ........................ 293/128 |
| 4,810,015 | 3/1989 | McNeil ........................ 293/128 |
| 4,988,138 | 1/1991 | Danna et al. ................ 293/109 |
| 5,060,994 | 10/1991 | Martin et al. ............... 293/128 |
| 5,188,407 | 2/1993 | Villaveces et al. .......... 293/128 |

FOREIGN PATENT DOCUMENTS

| | | | |
|---|---|---|---|
| 2564393 | 11/1985 | France ............................ 293/128 |
| 171638 | 8/1986 | Japan ............................. 293/128 |

OTHER PUBLICATIONS

"Ouch!" Dur-Gard article, Popular Mechanics, Aug. 1987, p. 50.

*Primary Examiner*—Mark Rosenbaum
*Assistant Examiner*—David P. Bryant
*Attorney, Agent, or Firm*—John R. Casperson

[57] ABSTRACT

An apparatus for protecting the side of a vehicle comprises a sheet of impact absorbing material such as foam which is bonded to a sheet of magnetic material, such as magnetic material embedded in a thin flexible polymer matrix. The apparatus is encased in a cover and is cross stitched to form a series of panels which are separated by fold lines.

14 Claims, 1 Drawing Sheet

MOTOR VEHICLE BODY PROTECTION APPARATUS AND METHOD OF MAKING

BACKGROUND OF THE INVENTION

In one aspect, this invention relates to a device for attachment to the side of a vehicle to prevent impact damage. In another aspect, this invention relates to covering an area on the side of a vehicle to prevent damage. In yet another aspect, the invention relates to making a device to prevent vehicle damage.

A common problem for people who park their vehicle in parking lots adjacent to other parked vehicles is that the opening and closing of the doors of adjacent vehicles often hit parked vehicles of other people thereby causing chipped paint and minor dents. People with new vehicles, newly painted vehicles or merely those who take very good care of their vehicles are particularly sensitive to this problem.

Various devices have been devised for attempting to solve the aforementioned problem. For example, U.S. Pat. No. 3,610,684 to Richter proposes to attach a pad to the door handle of a vehicle. One of the problems with this device is that in most newer vehicles, the handles are somewhat recessed, thereby making it difficult, if not impossible, to attach the Richter device thereto.

U.S. Pat. No. 3,738,695 to McBee proposes to use telescoping tubes suspended from the top of windows for protection purposes. A major problem with this device is installation and storage, especially since it is quite bulky.

U.S. Pat. No. 4,014,583 proposes to use some permanently attached brackets on the inside of the vehicle for suspending from straps which hold a vehicle body protection device in place. A major problem with such device is that very few people would be willing to permanently attach brackets to their vehicle. Furthermore, in alternate embodiments the attachment process appears to be extremely cumbersome since it is attached by rolling the window up and down to adjust the length to straps used to suspend the protection device.

U.S. Pat. No. 4,530,519 to Marshall proposes to use an extremely complicated device with an electric motor which rolls up a shield when not in use. Such device is believed to be too complicated and expensive to be practical.

My earlier patent U.S. Pat. No. 4,810,015 proposes use of a foam rubber pad retained in position at the wheel wells by straps and at top and bottom by magnets. It must be rolled up for storage. It takes time to apply and remove. It also has a number of components and is difficult to mass market at low cost.

A protection device for motor vehicle bodies which is simple and easy to manufacture and use would be very desirable.

SUMMARY OF THE INVENTION

In one aspect of the invention, a sheet of magnetic material is bonded to a sheet of impact absorbing material to form a protective panel. When the magnetic material is a thin sheet of magnetic particles in a flexible polymer matrix, it fastens well to the side of most vehicles, since it can conform to their curvature and will adhere to their steel construction.

In another aspect of the invention, an area on the side of a vehicle is covered with a plurality of the just described panels. When the panels are fastened together by hinges, they are easy to apply, easy to remove, and easy to store.

In another aspect of the invention, adjoining panels are formed by cross stitching a fabric cover covering a long sheet of magnetic material bonded to a long sheet of impact absorbing material. The procedure results in a hinge which joins the panels together. By using a pair of seams which are separated by about twice the thickness of the panel a very serviceable hinge is formed and the device will stay folded very well.

In all embodiments, the invention attaches magnetically to any metal-bodied vehicle. It can be attached and removed in seconds. It is preferably of weather-resistant, hydrophobic materials. Its length can be easily varied so that it can provide protection from wheel well to wheel well. When fabric covered, it can be screen printed with custom designs, monograms, or company logos, such as automobile dealerships, etc. It folds for compact storage. It can be manufactured using only a sewing machine.

DETAILED DESCRIPTION

Figure 1:
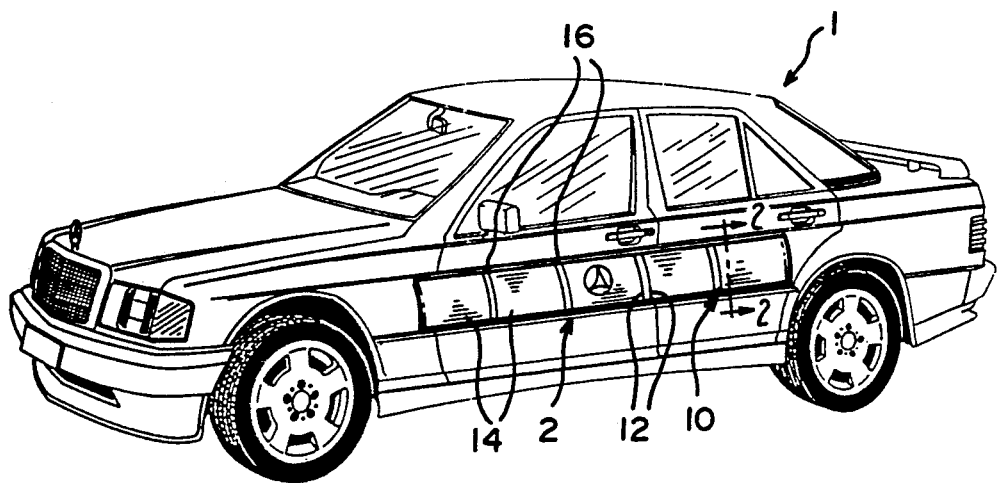
FIG. 1 is a pictorial illustration of a motor vehicle having the present motor vehicle body protection apparatus of the invention deployed on one side.
Figure 2:
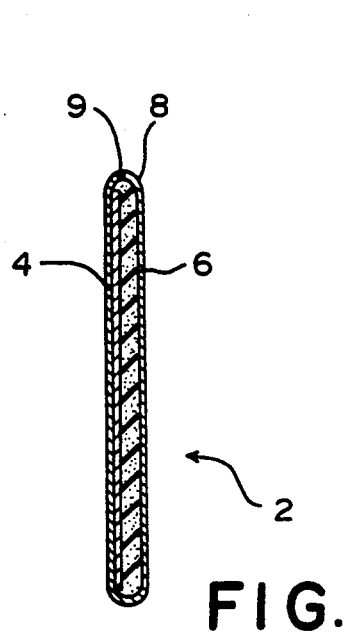
FIG. 2 is a cross-sectional view of the motor vehicle body protection apparatus of FIG. 1 when viewed along the indicated lines.

In FIG. 1, a motor vehicle body protection apparatus 2 is positioned on the side of a motor vehicle 1. Generally speaking, the motor vehicle 1 will be a passenger automobile or light truck. Preferably, the apparatus 2 extends substantially between the wheel wheels on passenger automobiles, because this is the area on the side of the automobile most in need of impact protection when the automobile is parked.

The apparatus 2 comprises a first layer 4 of a magnetic sheet and a second layer 6 of impact absorptive material bonded to the first layer. Generally speaking, the first layer 4 and the second layer 6 are substantially the same in area, because covering the entire backside of the absorptive layer with the magnetic sheet will provide good retention of the side of an automobile when the apparatus is used.

The first layer is generally formed by a thin, flexible magnetized polymer sheet. Suitable sheets can be formed from magnetic particles embedded in a continuous polymer matrix. The thickness of the first layer will generally be in the range of about 0.1 to about 5 mm, usually in the range of about 0.5 to about 2 mm. It is desirable that the first layer be as thin as possible and yet still provide good adhesion to the steel side of an automobile body, for maximum flexibility and minimum cost. Maximum flexibility is important because the sheet needs to conform to the side of the automobile body when the apparatus is deployed to provide best results.

The second layer, which is made of impact absorptive material, will usually be formed of a polyurethane foam pad or other material that is of a flexible, cushiony or padded nature. However, it is envisioned that for law enforcement or military use, bullet resistant material such as polyaramid (Kevlar) fibers may also be used. For civilian applications, closed cell foam or other hydrophobic foam is preferred, so that excessive amounts of water will not be absorbed in the event of rain. The thickness of the pad will generally be in the 0.2 to 5 cm range, usually in the 0.5 to 2.5 cm range. A device utilizing a pad thickness in the 0.5 to 1 cm range has been tested with good results.

Figure 3:
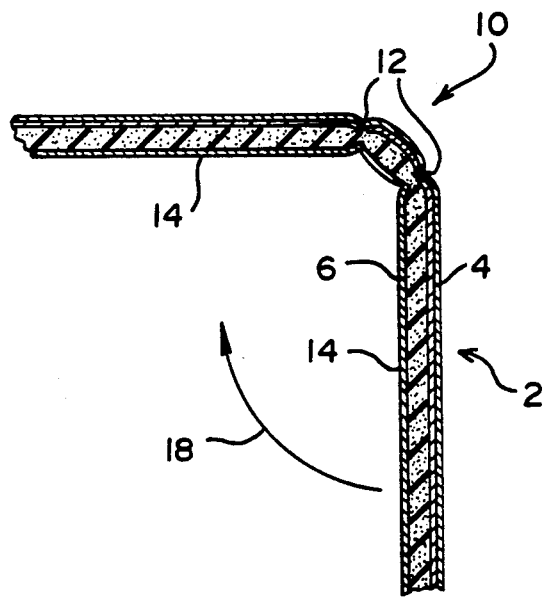
FIG. 3 is a longitudinal cross-section view of the motor vehicle body protection apparatus shown by FIGS. 1 and 2 in a different environment to show how it can be folded for compact storage.

The first layer 4 and the second layer 6 are preferably encased in a cover 8 formed from a suitable cover material. Polyamide fabric, such as nylon parachute type material is preferred, because it is durable and weather resistant. Preferably, a nylon fabric sheet surrounds the apparatus 2 joined by a longitudinal seam 9 at the top or bottom edge. The cover 8 can be imprinted with a suitable design if desired, or bear advertising, such as the name of a car dealership. The overall thickness of the apparatus will generally be in the 0.5 to 2.5 cm range. The apparatus 2 is made foldable by the provision of cross-stitching 10. The cross stitching is preferably across the width of the apparatus and perpendicular to the length of the apparatus, thus forming a folding hinge 16. Most preferably, the cross stitching comprises paired parallel lines of threaded stitches 12 which are separated from each other by roughly twice the thickness of the apparatus so that double folding hinges are formed which will facilitate folding and storage of the apparatus. The sewing tension is adjusted during fabrication to fine tune the hinge. FIG. 3 illustrates the folding of the apparatus 2 for storage by arrow 18.

The lines of cross stitching also divide the apparatus into a series of panel sections 14 along its length. Generally speaking, the panel sections will be rectangular in shape. Usually, the panel sections 14 will be substantially equally sized, so that the apparatus 14 can be neatly folded and stowed.

Figure 4:
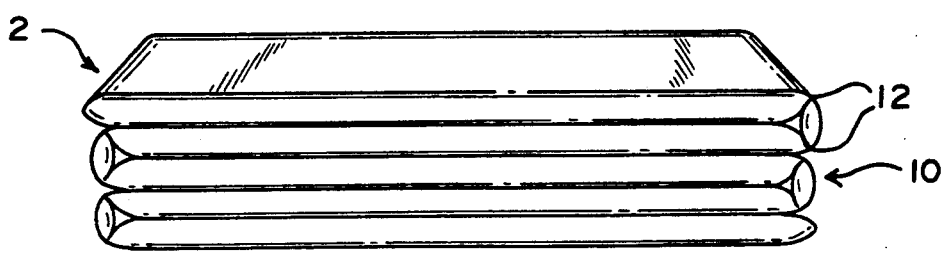
FIG. 4 is a pictoral representation of the invention shown in FIG. 1 in a folded position for storage.

In the folded and stowed condition, such as in FIG. 4, the panels sections form into a stack. Adjacent panels in the stack are joined by the hinges produced by the cross stitching. The apparatus is deployed by unfolding the panels to form a spread and applying the spread to the area on the side of the automobile to be protected. In another embodiment, the panels are unfolded along the side of the automobile, and the resulting spread is adjusted in position if necessary to cover the desired area.

The apparatus is easy to make. Generally speaking, it will less than 16 feet (5 meters) in length. Rolls of magnetic material and impact resistive material such as foam can be purchased, glued together, and the resulting composite either immediately cut into sections and further processed or rerolled for storage and subsequent use. The cover material can be formed into an inside out tube, seamed together, and turned rightside out for insertion of the composite. The resulting workpiece is completed by the application of end and double cross seams to form the hinges using an ordinary sewing machine.

I claim:

1. Apparatus for protecting motor vehicle bodies, said apparatus, when deployed, having a length, a width which is less than the length, and a thickness, said apparatus comprising:

a first layer of magnetic sheet,
    a second layer of impact absorptive material bonded to said first layer,
    wherein the first layer and the second layer are about the same size,
    a cover material encasing said first layer and said second layer, and
    a plurality of lines of cross stitching penetrating through the first layer, the second layer, and the cover material, said lines of cross stitching extending across the width of the apparatus generally perpendicular to the length to form folding hinges and to divide the apparatus into panels, said apparatus being characterized in that it is foldable for storage.

2. Apparatus as in claim 1 wherein the second layer comprises a polyaramid fiber fabric.

3. Apparatus as in claim 1 wherein the second layer comprises a resilient foam rubber pad.

4. Apparatus as in claim 3 wherein said cover material comprises a fabric.

5. Apparatus as in claim 4 having a thickness which is in the range of about 0.5 to about 2.5 cm.

6. Apparatus as in claim 5 wherein the first layer has a thickness in the range of 0.1 to 5 mm.

7. Apparatus as in claim 6 wherein the first layer has a thickness in the range of 0.5 to 2 mm and comprises a flexible polymer matrix.

8. Apparatus as in claim 7 wherein said plurality of lines of cross stitching are divided into paired lines of cross stitching, the two lines of cross stitching in each of the paired lines of cross stitching being separated from each other by roughly twice the thickness of the apparatus and forming a double folding hinge to facilitate folding and storage of the apparatus.

9. Apparatus as in claim 8 which is divided into a series of panel sections along its length by the plurality of double folding hinges formed by the cross stitching.

10. Apparatus as in claim 9 wherein the panels are substantially equally sized so that the apparatus can be neatly folded.

11. Apparatus as in claim 10 further comprising a design imprinted on the fabric cover.

12. A method for making a protective device for protecting the side of an automobile, said method comprising:

providing a sheet comprising a layer of magnetic material bonded to a layer of impact resistive material, said layer of magnetic material being substantially the same in area as the layer of impact resistive material;
    encasing said sheet in a fabric covering to form a workpiece; and
    cross-stitching seams across said workpiece to form fold lines.

13. A method as in claim 12 wherein said layer of magnetic material comprises a polymer matrix and has a thickness in the range of 0.5 to 2 mm, and said impact resistive material comprises a polymer foam having a thickness in the range of 0.5 to about 2.5 cm.

14. A method as in claim 13 wherein the cross stitched seams are stitched in pairs which are separated by a distance of approximately two times the thickness of the protective device.

* * * * *